US005690060A

United States Patent [19]
Dumoulin et al.

[11] Patent Number: 5,690,060
[45] Date of Patent: Nov. 25, 1997

[54] BELT FOR SELF-INSEMINATION OF SOWS

[76] Inventors: Patrick E. Dumoulin; Michael W. Dumoulin, both of 16N393 Walker Rd., Hampshire, Ill. 60140

[21] Appl. No.: 546,667

[22] Filed: Oct. 23, 1995

[51] Int. Cl.⁶ ................................................. A01K 21/00
[52] U.S. Cl. ........................................................ 119/858
[58] Field of Search ...................... 119/850–858, 865, 119/905, 907

[56] References Cited

U.S. PATENT DOCUMENTS

| | | | |
|---|---|---|---|
| 1,474,231 | 11/1923 | Brown | 119/856 X |
| 2,141,970 | 12/1938 | Buckingham | 119/854 |
| 3,107,653 | 10/1963 | Goddard, Jr. | 119/854 |
| 3,677,232 | 7/1972 | La Croce | 119/852 |
| 4,091,766 | 5/1978 | Colliard | 119/858 X |
| 5,307,764 | 5/1994 | Moy | 119/856 X |

Primary Examiner—Thomas Price
Attorney, Agent, or Firm—James C. Nemmers

[57] ABSTRACT

A self-insemination belt for use in the artificial insemination of sows. The belt has a body strap that wraps around the stomach of the sow just ahead of the hind legs and a back strap attached to the body strap so that the back strap lays along the sow's back. A detachable catheter holding strap is then attached to the back strap and then wrapped around the catheter to hold it in place.

5 Claims, 1 Drawing Sheet

BELT FOR SELF-INSEMINATION OF SOWS

BACKGROUND OF THE INVENTION

The raising of hogs as a business requires that the sows be artificially inseminated with boar semen. Products for carrying out the artificial insemination of sows are available and include catheters that are inserted into the cervix of the sow and are then connected to a cochette, tube or bottle containing the boar semen. In order to carry out self-insemination of the sows, there are currently available saddles which are typically weighted blankets that are set on the back of the sow and to which there can be attached a tube of semen which is in turn connected to the catheter. The device containing the boar semen must be in some manner attached to and held by the saddle. The known devices of this type for self-insemination are not adjustable so as to provide for differences in the heights of the sows. Also, the saddle tends to move as the sow moves around the confinement crate, and the saddles can fall off. Also, using the saddle and known devices can cause injury to the sow because the catheter projects outwardly, and if the sow backs into something, the sow can be injured. For this reason, sows being self-inseminated using known devices must always be inseminated in crates with an open back to minimize the possibility of injury. Moreover, the saddles are heavy and cumbersome and not easy to handle.

There is therefore a need for a simple, easy to use device to facilitate the self-insemination of sows. The need for such a device extends to a device that is fully adjustable, will not easily fall off and can be used with catheters having a flexible tube so that the sow will not be injured.

SUMMARY OF THE INVENTION

The invention provides a self-insemination belt that can be wrapped around the stomach of the sow with the free ends connectable and adjustable for any size of sow. The belt has affixed to it a back Strap that is laid on the back of the sow and to which there can be easily attached and detached a catheter-holding strap which is wrapped around the catheter tubing to hold the tubing in place.

DESCRIPTION OF THE PREFERRED EMBODIMENT OF THE INVENTION

Figure 1:
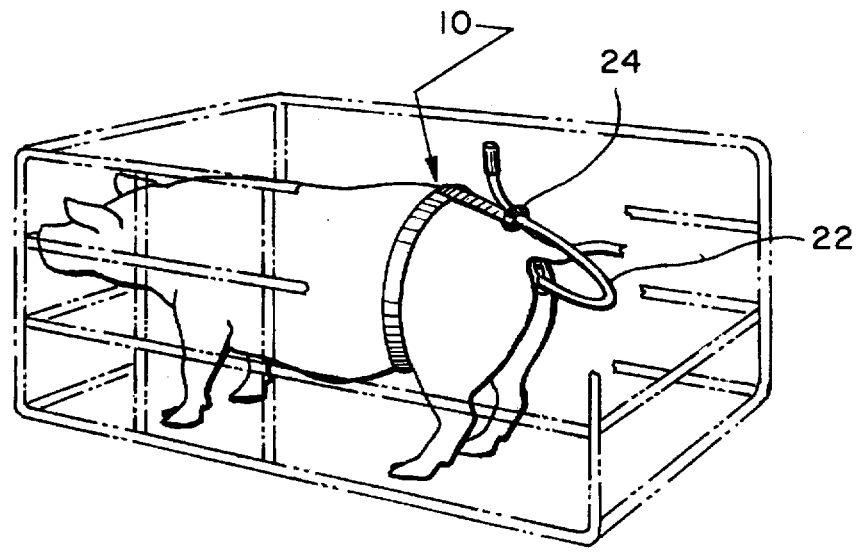
FIG. 1 is a view of a sow showing the self-insemination belt and catheter in place on the sow.
Figure 2:
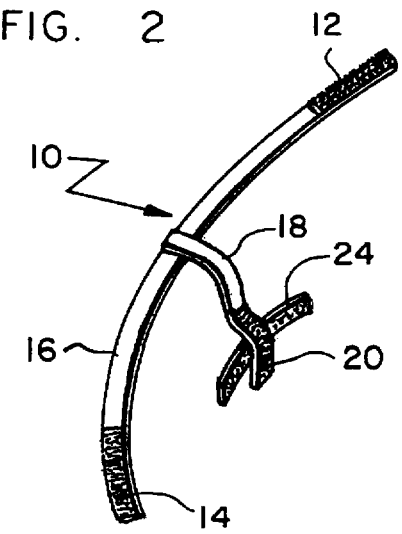
FIG. 2 is a perspective view of the self-insemination belt, integral back strap, and catheter holding strap.
Figure 3:
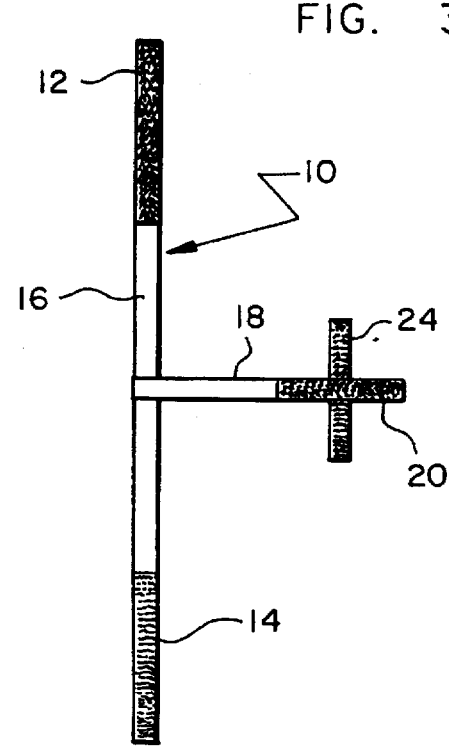
FIG. 3 is a plan view of the self-insemination belt with the belt laid out flat.

FIG. 1 shows the self-insemination belt of the invention in place on a sow. The belt includes a flexible body belt 10 which is a straight belt of any suitable durable material such as a fabric or leather. The belt is approximately six feet long, and at one free end 12 there is affixed to the belt 10 a strip of Velcro® loop material. Preferably, the Velcro® material extends along the free end 12 approximately eighteen inches. Similarly, at the other free end 14, there is affixed a strip of Velcro® hook material that extends approximately eighteen inches. The portion 16 of the belt 10 between the ends 12 and 14 may also contain a section of stretchable material so that when the body belt is wrapped around the stomach of the sow, it will be held firmly in place. The Velcro® material on the free ends 12 and 14 allows for a range of adjustability of the body belt 10 with easy connection of the free ends 12 and 14 once the belt 10 is wrapped around the sow's body.

Extending from approximately the center of the body belt 10 is a back strap 18. The back strap is approximately two feet in length, and has at its free end 20 a strip of Velcro® loop material. The back strap 18 is affixed to the body belt 18 in any suitable manner.

When it is desired to inseminate a sow, the body belt 10 is wrapped around the stomach of the sow just ahead of the hind legs so that the back strap 18 is centered on and laying down the back of the sow and extending to the rear. The back strap 18 is laid on the sow's back with the Velcro® loop laying against the sow's back. When the free ends 12 and 14 are secured to each other to hold the body belt 10 in place on the sow, and after insertion of the catheter 22 into the sow, the free end of the catheter, which is flexible, is raised upwardly until it engages the free end 20 of the back strap 18. A small catheter retaining strap 24 having one side covered with Velcro® loops and the opposite side covered with Velcro® hooks is then wrapped around the end of the catheter 22 and attached to the free end 20 of the back strap 13, thus holding the catheter 22 in place.

From the foregoing description it will be seen that the self-insemination belt of the invention, although very simple, solves the problems of the known devices. The body belt is fully adjustable for a sow of any size, and the problem of the height factor has been completely eliminated. The belt of the invention will not move because it is secured to the sow, and it is extremely quick and easy to use. Nothing protrudes from the sow in a manner that could cause injury to the sow in the event that the sow backs into her confinement crate, and thus, the self-insemination belt of the invention can be used with sows confined in any style of pen or crate. Obviously, the device is easy to handle and compact to store. It is also simple and inexpensive to manufacture.

Having thus described the invention in connection with the preferred embodiment of it, it will be evident to those skilled in the art that various revisions and modifications can be made to the embodiment described herein without departing from the spirit and scope of the invention. It is our intention, however, that all such revisions and modifications that are obvious to those skilled in the art will be included within the scope of the following claims.

We claim:

1. A self-insemination belt for use in the artificial insemination of sows using a catheter or the like, said belt comprising a body strap of sufficient length to be wrapped around and secured to the sow at the sow's stomach just ahead of the hind legs of the sow, the body strap having two free ends, fastening means at the free ends of the body strap to provide for adjustable and detachable connection of the free ends so that the body strap will fit sows of varying size, a single back strap fixedly attached to the body strap between said free ends and extending transversely to the body strap so as to lay on the sow's back, the back strap terminating in a free end, fastening means combined with the free end of the back strap, and a flexible catheter holding strap releasably secured to the fastening means of the back strap and having free ends connectable to each other to grip and hold the catheter used in the insemination.

2. The self-insemination belt of claim 1 in which the fastening means at the free end of the back strap is a Velcro material.

3. The self-insemination belt of claim 2 in which the body strap contains a portion of stretchable material.

4. The self-insemination belt of claim 3 in which the free ends of the catheter holding strap and the fastening means at the free ends of the body strap are each provided with Velcro material.

5. The self-insemination belt of claim 4 in which the back strap is fixedly attached to the body strap approximately midway between the free ends of the body strap.

* * * * *